United States Patent [19]

Abe

[11] 4,417,912
[45] Nov. 29, 1983

[54] METHOD OF PRODUCING CRYSTALLIZED GLASS FROM PHOSPHATE GLASS

[75] Inventor: Yoshihiro Abe, 2-4-43, Taihoh, Atsuta-ku, Nagoya-shi, Aichi-ken, Japan

[73] Assignees: Ashai Glass Company Ltd., Tokyo; Yoshihiro Abe, Nagoya, both of Japan

[21] Appl. No.: 315,864

[22] Filed: Oct. 28, 1981

[30] Foreign Application Priority Data

Oct. 28, 1980 [JP] Japan ................ 55/150114

[51] Int. Cl.³ ............................................. C03B 32/00
[52] U.S. Cl. ........................................ 65/33; 156/313; 23/296; 501/10
[58] Field of Search .............. 23/296, 300; 501/10, 501/2; 65/33; 156/616 R

[56] References Cited

U.S. PATENT DOCUMENTS

| | | | |
|---|---|---|---|
| 3,065,091 | 11/1962 | Russell et al. | 23/296 X |
| 3,241,935 | 3/1966 | Stookey | 65/33 |
| 3,298,795 | 1/1967 | Hamilton et al. | 65/33 X |
| 3,758,705 | 9/1973 | Schmid | 23/300 X |
| 3,922,155 | 11/1975 | Broemer et al. | 65/33 |
| 3,981,736 | 9/1976 | Broemer et al. | 501/10 |
| 4,231,776 | 11/1980 | Trojer et al. | 23/296 X |

FOREIGN PATENT DOCUMENTS

| | | | |
|---|---|---|---|
| 24032 | 2/1981 | European Pat. Off. | 501/10 |
| 51-73019 | 6/1976 | Japan | 501/10 |

OTHER PUBLICATIONS

Abe; Nature, vol. 282 No. 5734, pp. 55–56, Nov. 1, 1979.

*Primary Examiner*—Kenneth M. Schor
*Attorney, Agent, or Firm*—Oblon, Fisher, Spivak, McClelland & Maier

[57] ABSTRACT

A phosphate glass such as calcium metaphosphate ($Ca(PO_4)_2$) is heat-treated in a temperature gradient to obtain a crystallized glass (glass-ceramics) made of oriented fiber like crystals which has high bending strength in an abraded state.

3 Claims, 2 Drawing Figures

METHOD OF PRODUCING CRYSTALLIZED GLASS FROM PHOSPHATE GLASS

BACKGROUND OF THE INVENTION

1. FIELD OF THE INVENTION

The present invention relates to a method of producing a crystallized glass (glass-ceramics) from a phosphate glass.

2. DESCRIPTION OF THE PRIOR ART

The method of producing a calcium phosphate glass especially a calcium phosphate type crystallized glass has been proposed by the inventors in Japanese Examined Patent Publication No. 11625/1980. The resulting crystallized glass has been expected to be useful for ceramic materials for living bodies such as false teeth and artificial bones for surgery.

In accordance with the proposed method, the crystallized glass having a crystallinity of 20% or more is produced by melting, forming and heat-treating a glass having a formulation of 28 to 57 wt. % of CaO and 72 to 43 wt. % of $P_2O_5$ if necessary, with $Al_2O_3$, $SiO_2$ and/or $B_2O_3$ at a ratio of 10 wt. % or less to said components. In the crystallized glass obtained by the method, the crystals are grown at random and the crystallized glass has high compressive strength as 3000 to 5000 kg/cm$^2$, but has low bending strength in an order of about 500 kg/cm$^2$. Therefore, the fragility as a characteristic of ceramics is not improved.

It has been found that a crystallized glass made of $\beta$-Ca(PO$_3$)$_2$ crystals oriented in an elongated direction is obtained by elongating a rod made of a metaphosphate glass such as Ca(PO$_3$)$_2$ glass at a temperature higher than a glass transformation point by 30° to 40° C. under a tension and then, heat-treating it at a temperature around the glass transformation point or lower. (Nature Vol. 282 No. 5734 pp. 55–56 Nov. 1, 1979).

SUMMARY OF THE INVENTION

It is an object of the present invention to provide a method of producing a crystallized glass comprising oriented crystals obtained by the aforementioned method without an elongation and a method of producing a phosphate type crystallized glass having high strength in an advantageous industrial process.

The foregoing and other objects of the present invention have been attained by providing a crystallized glass having oriented crystals by producing metaphosphate glass having chain structure under a glassy state and crystalline state and heat-treating the glass in a temperature gradient.

DETAILED DESCRIPTION OF THE PREFERRED EMBODIMENTS

In the method of the present invention, the phosphate glass is produced at first. The phosphate glass is preferably made of calcium metaphosphate CaO.P$_2$O$_5$ which has the chain structure in a glassy state and also the chain structure in a crystalline state. It is possible to use a glass comprising the other alkaline earth metaphosphate such as SrO.P$_2$O$_5$, BaO.P$_2$O$_5$ and BeO.P$_2$O$_5$ instead of calcium metaphosphate. Such glass has the chain structure in a glassy state and crystalline state. The oriented crystals can be grown in the glass by the method of the present invention.

In the preparation of the glass batch, conventional sources such as a mixture of calcium carbonate and phosphoric acid or calcium dihydrogenphosphate Ca(H$_2$PO$_4$)$_2$.H$_2$O can be used. In the batch, a molar ratio of CaO to P$_2$O$_5$ is preferably 1:1, however, it is not critical and either of CaO or P$_2$O$_5$ can be excess of about 20%. The same condition can be considered in the case using the sources such as the alkaline earth metal source other than the calcium source. It is possible to incorporate a third component in the alkaline earth metal component and the phosphoric acid component so far as the growth of crystals having the chain structure is not prevented.

The glass batch is usually charged in a platinum crucible and is heat-melted at 1200°–1300° C. for 1–2 hours to uniformly vitrify. The molten glass is then cooled and formed into a desired shape such as a rod or plate in a suitable viscosity state.

In the heat-treatment of the formed glass for the crystallization, the glass is heated again in an atmosphere having a desired temperature gradient. The heat-treatment is carried out at a temperature slightly lower than the softening point and higher than the glass transformation point. When it is higher than the glass softening point, crystals are inwardly grown from the surface of the glass in the semi-spherical form to obtain an opaque crystallized glass having crystals oriented at random. The strength of the glass is remarkably low. On the other hand, when it is lower than the glass transformation point, the growth of oriented crystals is obtained, however, the growth velocity is remarkably lower so as not to be practically advantageous. In the case of the calcium phosphate glass, the heat-treatment is preferably carried out in a range of 590° to 500° C. especially 570° to 520° C. In this range of temperature, the temperature gradient is obtained where the glass is heat-treated.

Figure 1:
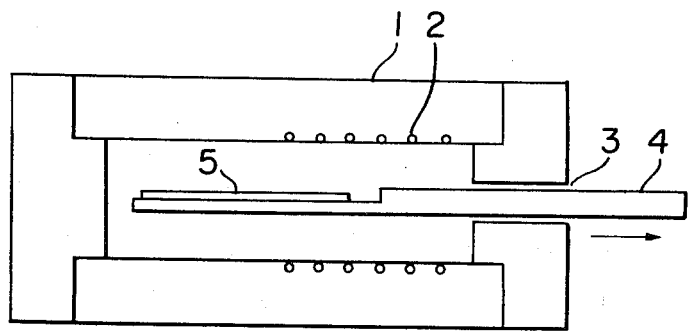
FIG. 1 is a sectional view of one embodiment of electric furnace used for the method of the present invention.

FIG. 1 is a sectional view of an electric furnace for the heat-treatment. The reference (1) designates an electric furnace; (2) designates a heater; (3) designates an inlet of the electric furnace from which a support (4) made of a refractory such as a quartz tube is inserted and a formed glass (5) such as a glass rod being heat-treated is placed on the support and inserted in the electric furnace.

Figure 2:
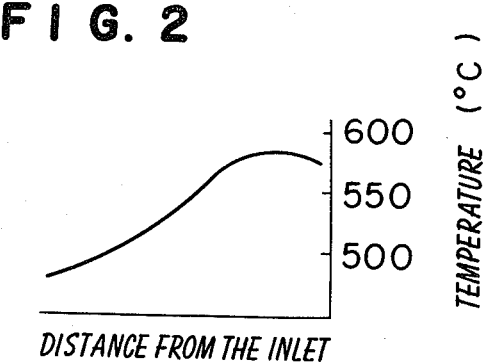
FIG. 2 is a graph showing temperature distribution in an electric furnace.

FIG. 2 is a graph showing the temperature distribution as one example of the temperature distribution in the electric furnace. The temperature is plotted on the ordinate and the distance from the entrance of the electric furnace is plotted on the abscissa. The temperature is controlled to give the temperature gradient from about 500° C. to 580° C. from about the middle part to the entrance in the longitudinal direction of the electric furnace. The temperature gradient is usually in a range of 5° to 100° C./cm preferably about 20° C. to 40° C./cm. One end of the formed glass (5) being heat-treated is set at the entrance side of the electric furnace at about 560°–570° C. and the other end is set in the lower temperature side. The support (4) is gradually taken out from the entrance whereby crystals crystallized at the high temperature part of the formed glass are grown to the direction of the lower temperature part. When the formed glass is passed through the temperature gradient region, all formed glass is converted into crystallized glass having fiber like crystals oriented in the direction of the temperature gradient as the direction of transferring of the formed glass. The transfer velocity of the formed glass is preferably controlled so that a rise in the temperature is at a rate of 0.1° C. to 10° C. per 1 hour. It is possible to transfer the electric furnace or to shift the temperature gradient region in the furnace instead of transferring the formed glass.

The reason why the oriented crystals are grown by the heat-treatment in the temperature gradient is not clear, however, it is considered that a volumetric contraction of about 10% is caused by a transformation of the glass having the chain structure into the crystals, and certain tensile is applied between the molecular chains of the glass at about the softening point and the molecular chains at lower temperature to crystallize the molecular chains of the glass under the orientation in the temperature gradient direction.

The crystallized glass obtained by the method of the present invention has high bending strength about 3 to 4 times of that of the glassy state and high Young's modulus about 2 times of that of the glassy state. Moreover, the crystallized glass has remarkably small reduction of the bending strength after abrasion to remarkably improve the fragility of ceramics themselves. The reason is considered to be that tenacity of the glass is improved by the oriented crystals and any sharp cracking is not easily formed by breaking even though the abrasion is present.

The present invention will be further illustrated by certain examples and references which are provided for purposes of illustration only and are not intended to be limiting the present invention.

EXAMPLE

In a platinum crucible, a powdery mixture of 33.8 wt. % of $CaCO_3$ and 66.2 wt. % of $H_3PO_4$ (molar ratio of $CaO/P_2O_5$ of 1:1) was heat-melted at 1250°–1300° C. for 2 hours with stirring in the later stage to obtain a uniform glass and the glass was cooled to about 1000° C. A sample glass rod having a diameter of about 2 mm and a length of about 5 cm was fabricated by dipping one end of a quartz rod in the molten glass and taking up the rod with the molten glass.

The sample glass rod was charged in the electric furnace shown in FIG. 1 and heat-treated by transferring it in the temperature gradient region. The temperature gradient region was maintained from 570° C. to 520° C. and was set at a rate of about 30° C. per cm in the longitudinal direction of the furnace. One end of the glass rod was set at the highest temperature (570° C.) of the temperature gradient and the other end of the glass rod was set at the lower temperature side to transfer the glass rod at a velocity of about 5 μ/min whereby the glass rod was heated at a rate of about 1° C. per hour. The crystals formed at the end of the glass rod at the higher temperature side were grown to the lower temperature side. The velocity of the transferring of the glass rod was controlled to keep the end of the growing oriented crystals in the temperature gradient region. The resulting crystallized glass rod had white translucent appearance and had oriented fiber like crystals of $\beta$-$Ca(PO_3)_2$ having a diameter of about 1μ in the longitudinal direction inside and had crystallinity of higher than 99%.

As a reference, the sample glass rod was heat-treated in the electric furnace having uniform temperature distribution at 550° C. for 100 hours. The resulting crystallized glass rod had white opaque appearance and had semispherical crystals grown from the surface at random.

Each Young's modulus and each bending strength of the oriented crystallized glass of the present invention; the randomly crystallized glass and the untreated glass were measured.

The bending strength was shown as an average of data of 3 samples.

The abraded bending strength was measured for each sample glass rod abraded by a sand paper of No. 100 at the central part.

The results are shown in Table.

|  | Untreated glass | Oriented crystallized glass | Randomly crystallized glass |
|---|---|---|---|
| Young's modulus (kg/cm$^2$) | 5.0 × 10$^5$ | 10.2 × 10$^5$ | can not be measured |
| Bending strength (kg/cm$^2$) | 900 | 3850 | 510 |
| Abraded bending strength (kg/cm$^2$) | 360 | 2990 | 450 |

The crystallized glass produced by the method of the present invention had characteristics having remarkably small reduction of the bending strength after abrasion and are preferably used as ceramic materials for living bodies such as artificial bones and for engineering.

I claim:

1. A method of producing crystallized glass from meta phosphate glass which comprises fabricating metaphosphate glass in an elongate shape and transferring the glass to a furnace having inside a temperature gradient ranging from the softening point to the glass transformation point of the glass and positioning the glass so that the longitudinal direction of the glass is parallel to the direction of the temperature gradient, and moving the glass so-positioned in the furnace, relative to the furnace, in the direction of the increase of temperature gradient so that a crystallized metaphosphate glass with its crystals oriented in its longitudinal direction is obtained.

2. The method according to claim 1 wherein said metaphosphate glass substantially has a formulation corresponding to $CaO.P_2O_5$, $BaO.P_2O_5$, $SrO.P_2O_5$ and/or $BeO.P_2O_5$.

3. The method according to claim 1 wherein the temperature gradient is from 5° to 100° C./cm.

* * * * *